Figure 1:
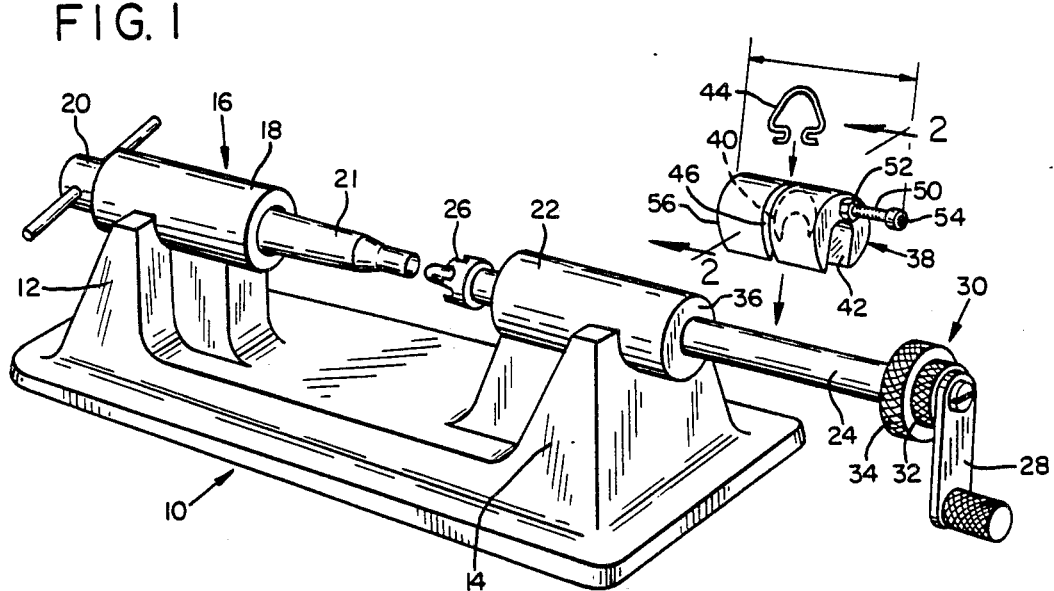

United States Patent [19]

Alexander

[11] Patent Number: 4,653,157
[45] Date of Patent: Mar. 31, 1987

[54] CARTRIDGE CASE TRIMMER METHOD OF USING SAME

[75] Inventor: Kenneth L. Alexander, Oroville, Calif.

[73] Assignee: Omark Industries, Inc., Portland, Oreg.

[21] Appl. No.: 801,735

[22] Filed: Nov. 26, 1985

[51] Int. Cl.⁴ .................. B23P 15/22; B23B 47/00
[52] U.S. Cl. ........................ 29/1.32; 408/241 S; 408/14
[58] Field of Search ............ 408/14, 241 S; 82/34 A; 29/1.32

[56] References Cited

U.S. PATENT DOCUMENTS

| | | | |
|---|---|---|---|
| 2,744,307 | 5/1956 | Smiley | 29/1.32 |
| 3,037,404 | 6/1962 | Burg | 408/241 S |
| 3,274,661 | 9/1966 | Westbrook | 29/1.32 |
| 3,724,963 | 4/1973 | Stadtmiller | 408/241 |
| 3,818,563 | 6/1974 | Beaulieu | 29/1.32 |

*Primary Examiner*—Howard N. Goldberg
*Assistant Examiner*—Steven Nichols
*Attorney, Agent, or Firm*—Robert L. Harrington

[57] ABSTRACT

A cartridge trimming apparatus of the mini-lathe variety. A removable stop member is provided between the cutter shaft holder and the cutter shaft handle. The stop member includes a length-adjusting screw that permits adjustment of the overall length of the stop member to accommodate a specific caliber of cartridge case. A lock nut locks the stop member to that specific caliber of cartridge. Different stop members are adjusted and locked to different calibers of cartridges. A mounting clip allows easy, rapid changing of the stop member on the trimmer to allow the user to quickly adapt the trimmer to the various calibers of cartridge cases.

4 Claims, 2 Drawing Figures

U.S. Patent     Mar. 31, 1987     4,653,157

CARTRIDGE CASE TRIMMER METHOD OF USING SAME

FIELD OF INVENTION

This invention relates to an apparatus that trims the length of ammunition cartridge cases, and more particularly to a trimmer apparatus that incorporates interchangeable length-setting members for rapidly setting the apparatus to trim cartridge cases of different calibers.

BACKGROUND OF INVENTION

Cartridge case trimmers, as contemplated herein, are of the mini-lathe variety, i.e. a selected cartridge case is locked in place and a blade is mounted on, or is an integral part of, a rotating shaft that is designed for controlled movement toward the mouth of the cartridge to engage and trim the case back to a desired length. Trimmers such as described above are used for refurbishing cartridge cases, i.e. where the cartridge has been fired and the spent cartridge case is cleaned, reshaped and reloaded. Such reloading of cartridge cases is popular among users of large numbers of cartridges, e.g., hunters, target shooters etc. There is a substantial savings to the reloader and he can, in effect, customize his own cartridges.

The trimming operation is made necessary because the explosion that takes place in the cartridge causes some expansion and elongation of the material of the cartridge case. The cartridges are designed to precisely fit the chamber of a specific type of firearm and thus the need for the trimmer.

The problem that is addressed by the present invention concerns the necessity of trimming cartridge cases to different lengths, i.e., different caliber cartridges (for different firearms) have different lengths. The enthusiast who loads his own cartridges is very likely to have a number of firearms and thus a number of different caliber cartridge cases that must be accommodated by the trimmer.

The trimmers presently in common use are equipped with an adjustable stop member that can be set so that the movement of the cutter into the cartridge case mouth is stopped at precisely the desired length of the cartridge. However, every time a different cartridge is to be trimmed, the reloader must readjust the stop member. Readjustment is a time consuming and tedious trial and error process.

BRIEF DESCRIPTION OF THE INVENTION

The present invention incorporates into the conventional trimmer, a stop member that is readily attached to, or removed from, the cutter shaft of the trimmer. The stop member includes an adjustment mechanism that can be adjusted to accommodate any desired length for the cartridge case. The adjustment can be locked and the stop member marked for future identification. Additional stop members are provided for each different caliber of cartridge case that the user reloads. Thus reloading no longer requires repeated readjustment of the trimmer's built in stop member to accommodate change over from one caliber to the next, but rather a simple and rapid replacement of one pre-adjusted stop member (of the present invention) for another.

Figure 2:
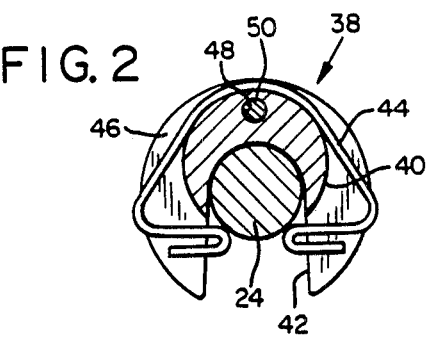

The invention will be more fully understood by reference to the following detailed description and drawings wherein;

FIG. 1 is a perspective view of a cartridge trimmer apparatus incorporating the present invention; and FIG. 2 is a cross section taken through the replaceable stop member (section lines 2—2 of FIG. 1, but mounted on the shaft of the trimmer apparatus).

Reference is first made to the trimmer apparatus as provided prior to the present invention. Referring to FIG. 1, a base member 10 includes spaced apart cradle portions 12 and 14. Mounted to cradle portion 12 is a cartridge holder 16. The cartridge holder comprises a cylinder 18 and a lock screw 20. The body of the cartridge 21 protrudes out of the cylinder 18 with the cartridge rim trapped inside the cylinder. The lock screw 20 is screwed into the cylinder 18 behind the cartridge to securely hold the cartridge.

Mounted to cradle portion 14 is a tubular bearing member 22 that slidably and rotatively carries a shaft 24. Mounted on or provided integral to the cartridge-facing-end of the shaft 24 is a cutter 26, and mounted on the opposite end of the shaft 24 is a hand crank 28. Slidably mounted on the shaft 24 between the crank 28 and bearing member 22 is an adjustable stop member 30. This stop member is comprised of a main bushing 32 that is slidably carried on the shaft 24, and a fine tune bushing 34 that is threadably carried on bushing 32. The required procedure for using the stop member 30 is: A course adjustment is accomplished by determining the approximate position of the main bushing 32 on the shaft 24. The bushing 32 is locked to shaft 24 at that position with a set screw (not shown). The precise or "fine tuned" position is then accomplished by rotating the fine tune bushing 34 on bushing 32 until the precise adjustment is achieved through a trial and error process. The fine tune bushing is then locked to the main bushing 32, also with a set screw.

With the proper setting of the stop member 30, a cutter 26 is cranked into the mouth of the cartridge until the bushing 30 engages the end 36 of the bearing member 22. At that point the cartridge case is trimmed to the exact desired length. As previously mentioned, when a cartridge case of a different caliber is to be trimmed, this setting procedure for stop member 30 is repeated.

Reference is now made to FIGS. 1 and 2 which illustrates a product of the present invention comprising a clip-on stop member 38. The stop member 38 is a cylindrical block 40 having a radially directed mounting slot 42 that fits the shaft 24 and generally locates the block with the shaft passing through the center of the block. An omega-shaped spring clip 44 is carried by the block, being seated in a peripheral groove 46 surrounding the block. With the block in place on the shaft, with the spring clip 44 having been forced around the shaft 24 as illustrated in FIG. 2, the block 40 is contained on the shaft but is permitted axial sliding movement along the shaft.

A thread tapped hole 48 drilled into the end of the cylindrical block 40 along an axis parallel to the axis of the block (and thus parallel to the axis of the shaft 24), receives a threaded screw 50. A lock nut 52 is screwed onto the threaded shaft of the screw 50 and the screw is provided with a head end 54 (a head being provided on the screw or, without such head, simply the extreme end of the screw shaft). It will be appreciated that, with the lock nut 52 backed up toward the head 54, the screw 50 can be screwed in and out of the hole 48 to vary (shorten or increase) the overall length of the stop member 38 (as measured from head end 54 to the opposite end 56 of the block 40). With the lock nut 52 screwed up and tightened against the block end opposite to block end 56, the screw 50 is locked in place to establish a fixed overall length for the stop member 38.

In operation, the integral stop member 30 is backed all the way to the handle 28 and permanently locked in place. Of course, should it be desired, a simple flange may be provided on the handle 28 or the shaft 24 and integral stop member 30 eliminated. The only requirement is that a fixed point of reference be provided for the stop member 38. The integral stop member 30 is illustrated to bring out the simple conversion of the old style of trimmer to the improved trimmer of this invention.

The stop member 38 is secured to the shaft by means of spring clip 44. Then the user goes through the procedure of adjusting the length of the stop member (by adjusting screw 50 as explained above) until, with the shaft pushed all the way toward the cartridge case 21 so that head end 54 engages the stop 30 and end 56 of the block 40 abuts end 36 of the bearing 22, the cutter 26 is precisely located to trim the cartridge case 21 to the desired length. The stop member 38 can stay in place on the shaft 24 until a different caliber of cartridge is to be trimmed. At that point the stop member 38 is slipped off the shaft, and it is stored. If not previously marked, it is preferable to note the caliber that the stop member is set for. When cartridges of that caliber are again to be trimmed, the same stop member is remounted on the shaft.

It will be noted that stop member 38 is removed from shaft 24 in a direction radial to the axis of shaft 24, by simply applying more force to the stop member 38 than the resisting force of the spring clip 44. Stop member 38 is resecured to the shaft 24 by placing slot 42 over shaft 24 and applying a similar force, but in the opposite direction. Removal of, or resecuring stop member 38 relative to shaft 24 is designed to be manually accomplished with only slight physical exertion and without the use of tools.

It will be appreciated that whatever number of different size cartridges are being reloaded, it is preferable to have a similar number of matching stop members 38, each being semi-permanently set to a specific length. Of course, if the reloader discontinues one caliber of cartridge and adds another, the stop member for the old cartridge can be reset (loosening the lock nut, adjusting the screw 50, and retightening the lock nut). Furthermore, whereas cartridges vary over a wide range of lengths, it is desirable to provide several different lengths of blocks 40, each being adjustable over a different subrange of caliber sizes. Thus one block size may cover as many as 10 cartridge sizes and 5 different lengths of blocks can accommodate as many as 50 cartridge sizes.

In a specific example, stop members were provided for an RCBS Brand trimmer having a ½ inch diameter shaft. The block 40 was made 1 inch long and 1 inch in diameter. The slot 42 was formed to a 0.510 width, just slightly larger than the diameter of the shaft. A hole 48, to accommodate a ⅛ inch diameter screw, was drilled and tapped to a depth of ¾ inch, and a circular groove 46 was formed, offset from the block circumference, to a radius of ⅜ inch, i.e., to provide a shallow groove depth at the point opposite the slot 42 (about 1/32 inch) and enlarging to accommodate the ⅜ inch radius as it surrounds the block (see FIG. 2). Spring clip 44 can be configured in a variety of ways but of course is designed to fit around the groove in the block 40 and under the shaft 24 to releasably hold the block to the shaft. (A preferred configuration is illustrated in FIGS. 1 and 2).

Having thus described a preferred embodiment of the invention, those familiar with the art will likely conceive of variations that are encompassed by the concept of the invention, as defined in the claims appended hereto.

I claim:

1. A trimmer for trimming different length cartridge cases in a cartridge reloading operation comprising; a first cradle including means for holding a cartridge case and a second cradle including means for slidably containing a shaft, and shaft contained in the second cradle with one end portion of the shaft projected from the second cradle toward the first cradle, and a second end portion projected from the second cradle toward the first cradle, and a second end portion projected from the second cradle away from the first cradle, a cartridge trimming cutter provided on said one end portion of the shaft and adapted to engage and trim a cartridge case held in the first cradle, a flange provided on the second end portion, bearing means to provide both sliding and rotative movement of the shaft relative to the second cradle, a plurality of removable stop members interchangeable one with the other, and each including a block, mounting means for slip-on mounting of the block onto the shaft between the flange and the bearing means slidably containing the shaft, said mounting means providing axial sliding movement of the block along the shaft, length-adjusting means provided on the block and removable with the block for adjusting the overall length of the stop member, and releasable lock means to releasably lock the length-adjusting means to thereby enable the locking of each stop member to a specific setting for a specific cartridge case length, said block and length-adjusting means cooperatively defining a pair of oppositely directed abutment faces adapted to abut the bearing means and the flange on the shaft upon full sliding movement of the shaft and cutter carried thereby toward a cartridge case held in the first cradle.

2. A trimmer as defined in claim 1 wherein the mounting means for the block has a radially directed shaft-receiving slot for radial slip-on mounting of the block to the shaft, and a spring clip mounted on the block that resiliently engages the shaft to releasably hold the block in sliding engagement onto the shaft.

3. A trimmer as defined in claim 2 wherein the length-adjusting means comprises the block having a threadedly tapped hole, a screw having a shaft and a head end, said screw shaft threadably engaged with the threaded hole in the block, a lock nut on the screw shaft, said block having a face on the extreme end opposite the head end of the screw whereby the distance between the block face and the screw head end establishes the overall length of the stop member to be adjusted by screwing the screw shaft into and out of the threaded hole of the block, and locked against adjustment by screwing the lock nut against the block.

4. A method for trimming cartridge cases comprising;
fixedly mounting a specific caliber cartridge case with the cartridge case mouth exposed to a cutter carried by a shaft that is axially movable for moving the cutter toward and away from the cartridge mouth, providing a plurality of length-adjustable stop members interchangeable one with the other and being removably mounted to the shaft for limiting thereby the movement of the shaft toward the cartridge case, adjusting the length of each of the stop members to stop the movement of the shaft and cutter carried thereby at the precise position desired for the length of the cartridge case, locking the length of the stop member independent of the shaft whereby the adjustment is retained upon removal, thereby to accommodate that specific cartridge case caliber upon subsequent remounting of the stop member, removing the cartridge case and stop member and repeating the above steps for different calibers of cartridge cases using successive similar stop members, and identifying the successive stop members according to the accommodated cartridge cases whereby, thereafter, different sizes of cartridge cases can be appropriately trimmed by equipping the trimmer with the identified accommodating stop member.

* * * * *